J. T. HALL.
LUBRICATING PULLEY.
APPLICATION FILED DEC. 14, 1911.
1,082,193.
Patented Dec. 23, 1913.
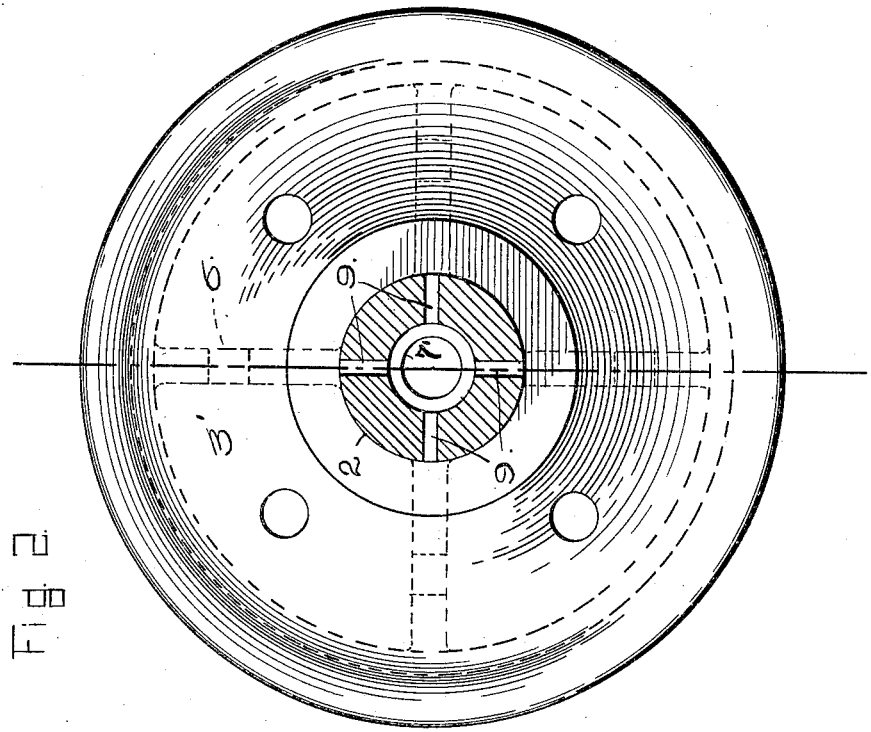
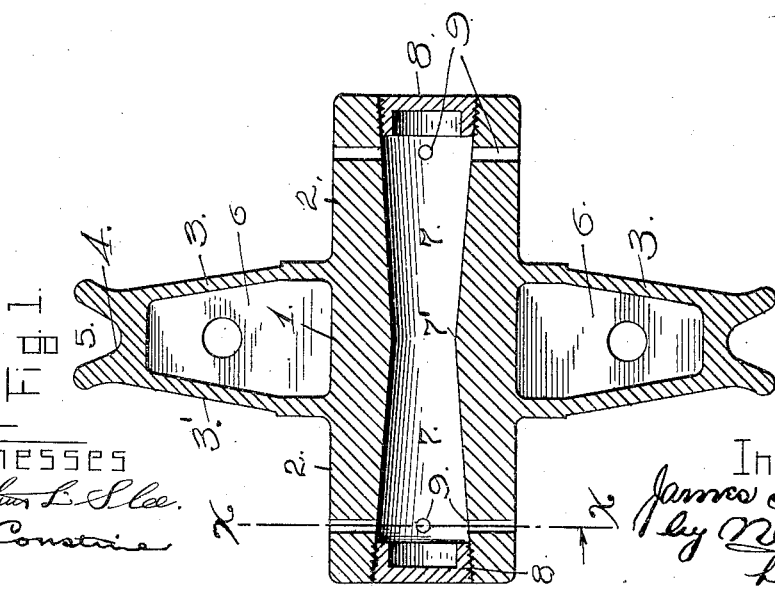

UNITED STATES PATENT OFFICE.

JAMES T. HALL, OF COALINGA, CALIFORNIA, ASSIGNOR TO BUNTING IRON WORKS, OF COALINGA, CALIFORNIA, A CORPORATION OF CALIFORNIA.

LUBRICATING-PULLEY.

1,082,193. Specification of Letters Patent. Patented Dec. 23, 1913.

Application filed December 14, 1911. Serial No. 665,686.

*To all whom it may concern:*

Be it known that I, JAMES T. HALL, a citizen of the United States, residing at Coalinga, in the county of Fresno and State of California, have invented certain new and useful Improvements in Lubricating-Pulleys, of which the following is a specification.

The hereinafter described invention relates to an improved construction of a sheave for use in connection with derricks employed in the oil fields for the boring of oil wells, the object of the invention being to provide a sheave capable of containing a body of lubricant for lubricating the bearings within which the trunnions of the sheave work, thereby overcoming the necessity of an attendant being required to mount the derrick at frequent intervals for the purpose of applying a lubricant for the sheave, and to strengthen the sheave in such a manner as to provide against the breaking thereof while in use, and by so doing overcoming the danger to which the attendant of the derrick is subjected by the use of the derrick sheaves as at present constructed. These sheaves, more commonly termed in the oil fields "crown" or "casing" pulleys are arranged at the top of the derrick, and revolve on cast iron trunnions. Inasmuch as the full load is placed thereon during the sinking of an oil well, it is essential that their construction be such as to successfully withstand the severe strains to which they are subjected, for the breaking of the sheave may seriously injure those stationed at the base of the derrick, and it is likewise essential that the sheave be maintained well lubricated at all times to secure ease of running.

To comprehend the invention, reference should be had to the accompanying sheet of drawings, wherein—

Figure 1 is a sectional view coincident with the axis of the sheave. Fig. 2 is a similar view transverse of the axis of the sheave, taken on line $x$—$x$ Fig. 1 of the drawings.

In the drawings, the numeral 1 is used to designate the hub of the sheave, which terminates in the trunnions 2. From the hub 1 spring the radial webs 3—3', which are disposed at an inward inclination. These webs or side plates are united to the tread 4, which is formed with a peripheral groove or channel 5, to receive a cable passing thereover. The angular disposed webs or side plates 3—3' are strengthened and united interiorly by means of the cross ribs 6, of which, in the present case, four such ribs are illustrated. By reason of the inclination at which the webs or side plates 3—3' are formed, and the bracing of the same by the interiorly disposed ribs, the sheave is materially strengthened throughout to resist the lateral and vertical strains placed thereon during the operation of well boring; in fact a double braced sheave is produced, which gives metal and strength where most needed.

Through the hub 1 and trunnions 2 is formed transversely the bore 7, which is outwardly inclined from the point 7' to the ends of the trunnions, being closed at each end by a cap 8 which screws into the ends of the trunnions, Fig. 1 of the drawings. This bore 7 is intercepted by the radial bores or outlets 9, formed circumferentially in the trunnions 2 adjacent the outer ends thereof. For lubricating purposes the central bore 7 is packed throughout the length thereof with a suitable lubricant, which is seated therein by means of the end caps 8. During use of the sheave the frictional heat generated causes the lubricant to flow toward each end of the trunnions, from whence it escapes through the circumferentially disposed outlets 9 into the bearing boxes for the sheave. In this manner the sheave is self lubricating so long as lubricant is maintained within the central bore 7, which may be readily replenished by simply removing one of the end caps 8 and repacking the bore with lubricant. However, this will only be required at long intervals, thus relieving the attendant of the necessity of frequently providing oil for the bearings.

The entire sheave is made from a single casting, and, by reason of the hollowed interior thereof, is of extreme lightness, as compared with a solid casting.

Having thus described the invention what is claimed as new and desired to be protected by Letters Patent is—

1. A lubricating pulley formed from a single casting, the same comprising a suitable hub and extended trunnions, said hub and trunnions provided with a central bore extending therethrough, and said bore being outwardly inclined toward each end of the trunnions, end caps closing the said bore, and circumferentially disposed outlets leading from the said bore for conveying lubricant to the bearings for the pulley.

2. A lubricating pulley formed with a hub and integral outwardly disposed trunnions, said hub and trunnions provided with a central bore formed therein, said bore being outwardly inclined from its center toward each end of the flange, end caps closing said bore, and circumferentially disposed outlets communicating with said bore adjacent the end of each flange and forming passages for the escape of lubricant to the bearings for the pulley.

In testimony whereof I have signed my name to this specification in the presence of two subscribing witnesses.

JAMES T. HALL.

Witnesses:
 THOS. J. HICKEY,
 M. C. CROZIER.

Copies of this patent may be obtained for five cents each, by addressing the "Commissioner of Patents, Washington, D. C."